United States Patent [19]
Thomas

[11] Patent Number: 5,494,319
[45] Date of Patent: Feb. 27, 1996

[54] SLEEVED FLEXIBLE METAL PIPING, METHOD OF MANUFACTURING SAME AND FLUE SYSTEM APPLICATION OF SAME

[75] Inventor: R. Winfield Thomas, West Lebanon, Ind.

[73] Assignee: Tru-Flex Metal Hose Corporation, West Lebanon, Ind.

[21] Appl. No.: 254,917

[22] Filed: Jun. 6, 1994

[51] Int. Cl.$^6$ .............................. F16L 9/147; F16L 13/16
[52] U.S. Cl. .............................. 285/55; 285/156; 285/149; 285/382; 138/122; 138/154; 454/44; 454/47; 29/505
[58] Field of Search .............................. 285/55, 156, 149, 285/903, 133.1, 382; 138/122, 134, 135, 136; 454/44, 47; 29/505, 509, 429

[56] References Cited

U.S. PATENT DOCUMENTS

| | | |
|---|---|---|
| 925,317 | 6/1909 | Eldsed . |
| 1,133,070 | 3/1915 | Subers . |
| 1,315,548 | 9/1919 | Fletcher et al. . |
| 1,913,390 | 6/1933 | Hungerford . |
| 1,978,529 | 10/1934 | Harrah . |
| 2,013,193 | 9/1935 | Stadfeld . |
| 2,257,895 | 10/1941 | Woodford et al. . |
| 2,365,181 | 12/1944 | Fentress . |
| 2,419,453 | 4/1947 | Kocevar . |
| 2,420,153 | 5/1947 | Sprenger et al. . |
| 2,516,631 | 7/1950 | Jacobson . |
| 2,609,002 | 9/1952 | Meissner . |
| 2,628,111 | 2/1953 | Smalline . |
| 2,841,183 | 7/1958 | Rejeski . |
| 2,857,176 | 10/1958 | McTaggert et al. . |
| 2,867,242 | 1/1959 | Harris et al. . |
| 3,056,616 | 10/1962 | Jaros . |
| 3,086,556 | 4/1963 | Kanter . |
| 3,135,295 | 6/1964 | Ziebold . |
| 3,169,785 | 2/1965 | Ziebold . |
| 3,299,417 | 1/1967 | Sibthorpe . |
| 3,393,267 | 7/1968 | Busse . |
| 3,549,176 | 12/1970 | Contreras . |
| 3,621,663 | 11/1971 | Otani . |
| 3,623,513 | 11/1971 | Dinkelkamp . |
| 3,740,930 | 6/1973 | Cullom ..................... 454/47 |
| 3,759,552 | 9/1973 | Levinsohn et al. . |
| 3,815,639 | 6/1974 | Westerbarkey ........................ 138/135 |
| 3,841,207 | 10/1974 | Piot ........................................ 454/47 |
| 3,948,295 | 4/1976 | Lemont et al. . |
| 4,141,385 | 2/1979 | Siegwart . |
| 4,220,181 | 9/1980 | Nyssen ................................. 138/135 |
| 4,262,162 | 4/1981 | Plinke et al. . |
| 4,303,105 | 12/1981 | Rohner . |
| 4,377,188 | 3/1983 | Siegwart ............................... 138/135 |
| 4,481,978 | 11/1984 | Escandell . |
| 4,811,976 | 3/1989 | Yagisawa . |
| 4,846,147 | 7/1989 | Townsend et al. ...................... 454/44 |
| 4,854,416 | 8/1989 | Lalikos et al. . |
| 5,015,018 | 5/1991 | Arnoldt . |
| 5,222,288 | 6/1993 | Thomas .................................. 29/514 |
| 5,228,479 | 7/1993 | Thomas ................................. 138/149 |
| 5,259,418 | 11/1993 | Hamrick ................................ 138/122 |
| 5,393,260 | 2/1995 | Barth ....................................... 454/44 |

FOREIGN PATENT DOCUMENTS

| | | |
|---|---|---|
| 813071 | 3/1981 | U.S.S.R. . |
| 1613777A | 12/1990 | U.S.S.R. . |

*Primary Examiner*—Eric K. Nicholson
*Attorney, Agent, or Firm*—Litman, McMahon and Brown

[57] ABSTRACT

Insulated flexible metal piping is provided which includes a metal piping section having inner and outer windings comprising metal bands which are spiral-wound in overlying relation with their leading and trailing edges forming a spiral, interlocked seam. The flexible metal piping section is slidably inserted in an insulating sleeve, which can comprise a plastic material for enclosing the metal piping section. A method of forming the insulated metal piping is disclosed which includes the steps of providing inner and outer spiral windings; interlocking the leading and trailing edges thereof; and slidably inserting a flexible metal piping section formed thereby in an insulating sleeve. Further disclosed is an application of the insulated metal piping in a flue system.

19 Claims, 1 Drawing Sheet

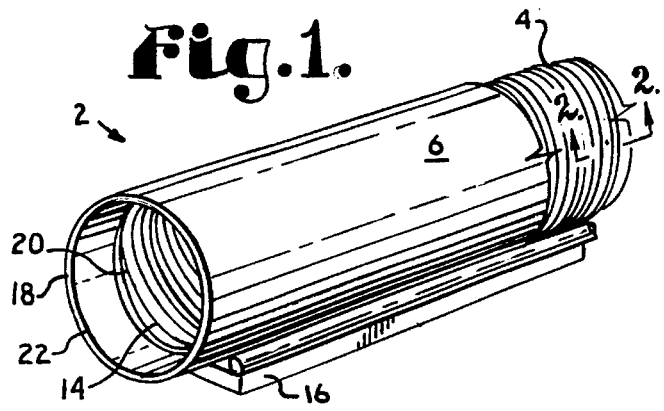
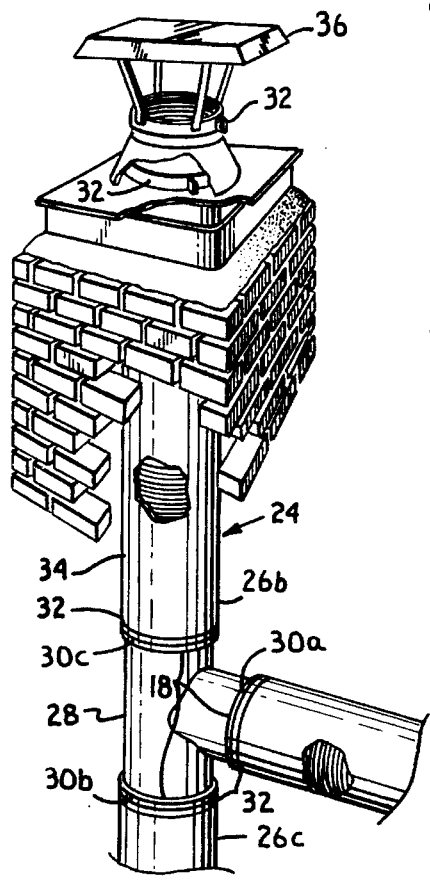
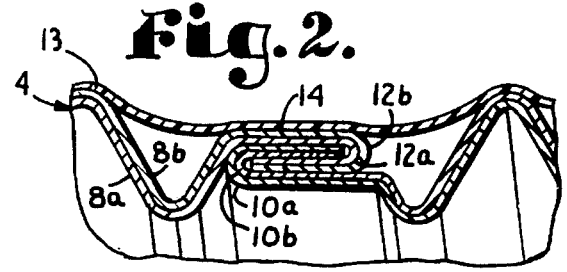
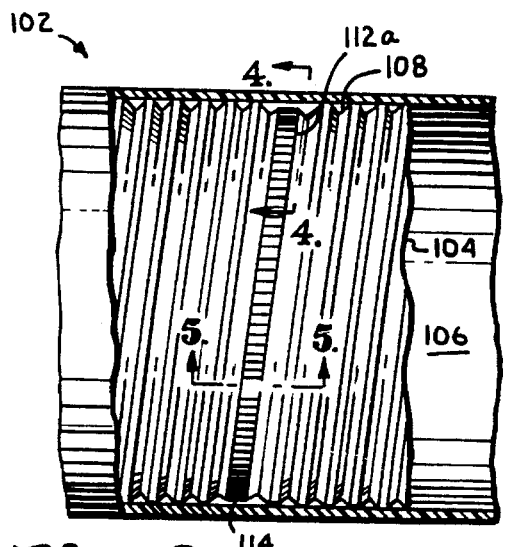
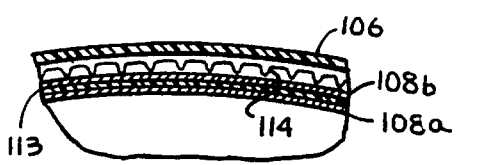

SLEEVED FLEXIBLE METAL PIPING, METHOD OF MANUFACTURING SAME AND FLUE SYSTEM APPLICATION OF SAME

BACKGROUND OF THE INVENTION

1. Field of the Invention

The present invention relates generally to flexible piping, and in particular to insulated flexible piping with an inner flexible metal piping section and an outer insulating sleeve.

2. Description of the Related Art

Flexible piping is desirable in a variety of applications for handling fluids and bulk materials. For example, Thomas U.S. Pat. No. 5,228,479, which is assigned to a common assignee herewith, discloses multi-layered flexible piping and a method and machine for forming same. Examples of spiral-wound flexible metal piping date back at least as early as the 1930's, as exemplified by the Hungerford U.S. Pat. No. 1,913,390 for flexible metal tubing having a single layer construction. Such spiral-wound flexible metal piping or hose has previously been provided with insulated coverings. For example, the Busse U.S. Pat. No. 3,393,267 discloses a connector for jacketed strip-wound metal hose wherein a plastic electrical insulation material jacket is tightly fit over the exterior of spiral-wrapped metal hose.

The Lalikos et al. U.S. Pat. No. 4,854,416 discloses a convoluted conduit which is provided with a loosely-fitting outer braid sleeve or stocking for increasing pressure carrying capability, for providing an armor protection for an inner core and for controlling stiffness and resonant frequency for dampening vibration.

However, heretofore there has not been available insulated flexible metal piping with the advantages and features of the present invention.

SUMMARY OF THE INVENTION

In the practice of the present invention, insulated flexible metal piping is provided which includes a section of flexible metal piping comprising inner and outer metal bands which are spiral-wrapped and interlocked at their leading and trailing edges. An insulating sleeve, which can comprise a suitable plastic or other material, receives the flexible metal piping section. A method of forming the insulated flexible piping includes the steps of spiral-winding inner and outer metal bands to form a spiral-wound flexible metal piping section and longitudinally slidably inserting the flexible metal piping section in an insulating sleeve. The insulated flexible piping can be installed in a flue system application with inlet sections connected to a tee connector and an outlet section connected to a rain hat.

OBJECTS AND ADVANTAGES OF THE INVENTION

The principal objects and advantages of the present invention include providing insulated flexible metal piping; providing such piping with flexible metal piping sections which can be formed on existing pipe-forming equipment; providing such piping which can include interlocked leading and trailing metal band edges; providing such insulated piping which can include a variety of different insulating sleeves adaptable to various applications; providing such piping which can be essentially fluid-tight; providing such piping which can be resistant to various environmental conditions; providing such piping which can be used to form an insulating flue system; providing a method of forming insulated flexible metal piping; and providing such a method which is economical, efficient and which results in a product well suited for the proposed applications therefor.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a section of sleeved flexible metal piping embodying the present invention, showing a section of spiral-wound flexible metal piping being inserted in an insulating sleeve.

FIG. 2 is an enlarged, longitudinal cross-sectional view of the piping, taken generally along line 2—2 in FIG. 1.

FIG. 3 is a longitudinal cross-sectional view of sleeved flexible metal piping comprising a first alternative embodiment of the present invention.

FIG. 4 is an enlarged, fragmentary, transverse cross-sectional view thereof, taken generally along line 4—4 in FIG. 3.

FIG. 5 is an enlarged, fragmentary, longitudinal cross-sectional view thereof, taken generally along line 5—5 in FIG. 3.

FIG. 6 is a perspective view of a lined flue system embodying the present invention.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates insulated, flexible metal piping embodying the present invention and generally comprising flexible metal piping 4 received within an insulating sleeve 6.

II. Flexible Metal Piping 4

Without limitation on the generality of useful flexible metal pipings 4 which can be employed with the present invention, the flexible piping disclosed in the Thomas U.S. Pat. No. 5,228,479, which is incorporated herein by reference, is suitable for use with the present invention. Such piping includes inner and outer layers comprising metal bands 8a, 8b with leading edges 10a, 10b and trailing edges 12a, 12b. The leading edges 10a, 10b are interlocked with the trailing edges 12a, 12b to form an interlocked, spiral seam 14. The interlocked spiral seam 14 can permit limited movement between the interlocked edges 10a, 10b and 12a, 12b which, together with the ban corrugations or convolutions 13, provide flexibility for the metal piping 4.

III. Insulating Sleeve 6

The insulating sleeve 6 is generally tubular and can comprise a variety of flexible materials which can be chosen for the requirements of particular applications. For example, various plastic materials can be used, such as polypropylene, which can provide fluid sealing, corrosion resistance and thermal insulation properties. Moreover, the material chosen for the insulating sleeve can provide resistance to certain types of chemicals. Still further, the insulating material of the sleeve 6 can comprise various metals, including foils, or cloth, fiberglass, ceramic and paper materials. Moreover, plastic materials with "heat shrink" characteristics can be chosen whereby the insulating sleeve 6 can be shrunk by applying heat thereto after receiving the metal piping 4 to securely bond the insulating sleeve 6 to the metal piping 4. Both high and low temperature embodiments of the piping 2 can be produced according to the present invention to meet the requirements of particular applications thereof.

IV. First Alternative Embodiment Sleeved Flexible Metal Piping 102

FIGS. 3–5 show insulated, sleeved, flexible metal piping 102 comprising an alternative embodiment of the present invention. A modified metal piping section 104 includes an inner metallic metal band 108a with leading and trailing edges 110a, 112a which are folded and interlocked. An outer metallic band 108b includes a trailing edge 112b which overlies a leading edge 110b thereof. A strip of intermediate insulating material 113 is spiral-wound beneath the outer band 108b and over the inner band 108a. The bands 108a, 108b and 113 form a spiral seam 114 which is knurled for connecting same in a substantially fluid-tight relationship as shown in FIGS. 4 and 5. The metal piping section 104 is received in an insulating sleeve 106.

V. Manufacturing Method

The insulated metal piping 2 can be manufactured according to a variety of suitable methods. A method of spiral-winding the metal piping 4 is disclosed in the aforementioned Thomas U.S. Pat. No. 5,228,479.

The metal piping 14 exits a winding station of a winding machine in a direction generally aligned with the longitudinal axis of the metal piping 4. The insulating sleeve 6 can be placed on a rack 16 in an open, generally tubular configuration (FIG. 8) for receiving the metal piping 4 as it exits the winding machine. Thus, as the metal piping 4 advances from the winding machine, it is slidably, coaxially inserted into the insulating sleeve 6. When a desired length of metal piping 4 has been inserted into a desired length of insulating sleeve 6, appropriate cuts are made in each. The insulating sleeve 6 can be provided with end extensions 18 which extend from respective ends 20 of the metal piping 4 and terminating at insulating sleeve ends 22. The insulating sleeve end extensions 18 can be of nearly any suitable length.

VI. Flue Liner System 24 Application

An exemplary application of the insulated metal piping 2 comprises a flue liner system 24 as shown in FIG. 6. The flue liner system 24 includes first, second and third sections 26a, 26b and 26c of the insulated metal piping 2. The insulated metal piping sections 26a, 26b comprise a pair of inlets to the flue liner system 24 and can be attached at their ends to devices which produce exhaust gas, such as furnaces, hot water heaters, woodburning stoves, etc. The exhaust gas characteristics including temperature, toxicity, chemical composition, etc. can be factors in determining the materials of the metal piping 4 and the insulating sleeve 6.

The insulated metal piping section 26c receives the combined gas stream from the insulated metal piping sections 26a, 26b.

A 3-way fitting or connector such as a tee connector 28 is connected to the insulated metal piping sections 26a, 26b, 26c at connections 30a, 30b, 30c. Such connections are generally annular and can be formed with the insulating sleeve end extensions 18 generally covering such connections. Suitable annular fastening means 32 is provided for attaching the insulated metal piping sections 26a, 26b, 26c to the connector tee 28, and can comprise various suitable annular fastening means 32, including tape, hose clamps, adhesives, etc.

The insulated metal piping section 26b can extend upwardly through a flue 34 and terminate at a fitting such as a rainhat 36, which is likewise connected to the insulated metal piping section 26b by a suitable annular fastening means 32.

The insulated metal piping 2 shown and described in connection with a flue liner section 24 can be adapted for various other suitable applications thereof.

It is to be understood that while certain forms of the present invention have been illustrated and described herein, it is not to be limited to the specific forms or arrangement of parts described and shown.

What is claimed and desired to be secured by Letters Patent is as follows:

1. Sleeved flexible metal piping, which includes:
   (a) a first, inner spiral winding comprising a metallic band with leading and trailing edges;
   (b) a second, outer spiral winding comprising a metallic band with leading and trailing edges, said outer winding overlying said inner winding, said outer spiral winding having an outer diameter;
   (c) said leading edge of said inner winding being interlocked with said trailing edge of said inner winding;
   (d) a spiral seam including means for connecting said outer winding leading and trailing edges with said inner winding interlocked leading and trailing edges respectively; and
   (e) a tubular sleeve receiving said interlocked inner and outer spiral windings, said tubular sleeve having an inner diameter substantially equal to said outer spiral winding outer diameter, said tubular sleeve being in substantially continuous contact with said outer spiral winding.

2. The sleeved flexible metal piping of claim 1 wherein said sleeve comprises a polymeric material.

3. The sleeved flexible metal piping of claim 2 wherein said sleeve comprises polypropylene.

4. The sleeved flexible metal piping of claim 1, which further includes:
   (a) an end; and
   (b) a fitting mounted thereon.

5. The sleeved flexible metal piping of claim 1, which further includes:
   (a) said first and second spiral windings forming a flexible metal piping section;
   (b) said flexible metal piping section having an end; and (c) said sleeve including an end extension extending beyond said flexible metal piping section end.

6. The sleeved flexible metal piping of claim 1, which includes:

(a) said metallic bands of said inner and outer windings being longitudinally corrugated.

7. The sleeved flexible metal piping of claim 1 wherein said spiral seam is knurled.

8. The sleeved flexible metal piping of claim 1, which includes:

(a) an intermediate spiral winding comprising an insulating material spiral-wound between said inner and outer spiral windings.

9. The sleeved flexible metal piping of claim 1 wherein:

(a) said outer winding leading and trailing edges overlie each other; and (b) said interlocked spiral seam is knurled.

10. The sleeved flexible metal piping of claim 1 wherein:

(a) said outer winding leading and trailing edges are folded together and interlocked with said inner winding leading and trailing edges respectively.

11. A sleeved gas conduit system which includes:

(a) an upstream section of sleeved flexible metal piping having an inlet and outlet ends;

(b) a downstream section of sleeved flexible metal piping having an inlet and outlet ends;

(c) each said sleeved flexible metal piping section including:

(1) a first, inner spiral winding comprising a metallic band with leading and trailing edges;

(2) a second, outer spiral winding comprising a metallic band with leading and trailing edges, said outer winding overlying said inner winding, aid outer spiral winding having an outer diameter;

(3) said leading edge of said inner winding being interlocked with said trailing edge of said inner winding;

(4) a spiral seam including means for connecting said outer winding leading and trailing edges with said inner winding interlocked leading and trailing edges respectively;

(5) a tubular sleeve receiving said interlocked inner and outer spiral windings, said tubular sleeve having an inner diameter substantially equal to said outer spiral winding outer diameter, said tubular sleeve being in substantially continuous contact with said outer spiral winding; and (d) connector means for fluidically connecting said upstream section outlet end and said downstream section inlet end.

12. The sleeved gas conduit system of claim 11, which further includes:

(a) an intermediate section of sleeved flexible metal piping having inlet and outlet ends;

(b) a tee connector interconnecting said upstream section outlet end, said intermediate section outlet end and said downstream section inlet end; and (c) a rainhat mounted on said downstream section outlet end.

13. A method of forming insulated flexible metal piping, which comprises the steps of:

(a) providing a first, inner spiral winding comprising a metallic band with leading and trailing edges;

(b) providing a second, outer spiral winding comprising a metallic band with leading and trailing edges and winding said outer winding in overlying relationship with respect to said inner winding, and providing said outer winding with an outer diameter;

(c) interlocking said inner winding leading edge with said inner winding trailing edge;

(d) forming a spiral seam including means for connecting said outer winding leading and trailing edges with said inner winding interlocked leading and trailing edges respectively; and (e) providing a tubular sleeve and slidably, longitudinally inserting said inner and outer windings in said tubular sleeve, providing said tubular sleeve with an inner diameter substantially equal to the outer winding outer diameter, and contacting said outer winding substantially continuously with said sleeve.

14. The method of claim 13, which includes the additional step of:

(a) extending opposite ends of said tubular sleeve beyond opposite end of said inner and outer windings.

15. The method of claim 13, which includes the additional steps of:

(a) providing a tee-connector with first and second inlets and an outlet;

(b) providing first, second and third sections of said insulated metal piping;

(c) fluidically connecting said first, second and third sections of said insulated flexible metal piping to said inlets and outlets of said connector respectively; and (d) forming an insulated, flexible metal flue system with said piping sections and said connector.

16. The method of claim 13, which includes the additional steps of:

(a) providing a rainhat; and (b) connecting said rain cap to an end of said third insulated flexible piping section opposite to an end thereof connected to said tee connector.

17. Sleeved flexible metal piping, which includes:

(a) a first, inner spiral winding comprising a metallic band with leading and trailing edges;

(b) a second, outer spiral winding comprising a metallic band with leading and trailing edges, said outer winding overlying said inner winding;

(c) said leading edge of said inner winding being interlocked with said trailing edge of said inner winding;

(d) a spiral seam including means for connecting said outer winding leading and trailing edges with said inner winding interlocked leading and trailing edges;

(e) a tubular sleeve receiving said interlocked inner and outer spiral windings; and (f) said spiral seam being knurled.

18. Sleeved flexible metal piping, which includes:

(a) a first, inner spiral winding comprising a metallic band with leading and trailing edges;

(b) a second, outer spiral winding comprising a metallic band with leading and trailing edges, said outer winding overlying said inner winding;

(c) said leading edge of said inner winding being interlocked with said trailing edge of said inner winding;

(d) a spiral seam including means for connecting said outer winding leading and trailing edges with said inner winding interlocked leading and trailing edges;

(e) a tubular sleeve receiving said interlocked inner and outer spiral windings; and (f) an intermediate spiral winding comprising an insulating material spiral-wound between said inner and outer spiral windings.

19. Sleeved flexible metal piping, which includes:

(a) a first, inner spiral winding comprising a metallic band with leading and trailing edges;

(b) a second, outer spiral winding comprising a metallic band with leading and trailing edges, said outer winding overlying said inner winding;

(c) said leading edge of said inner winding being interlocked with said trailing edge of said inner winding;

(d) a spiral seam including means for connecting said outer winding leading and trailing edges with said inner winding interlocked leading and trailing edges;

(e) a tubular sleeve receiving said interlocked inner and outer spiral windings;

(f) said outer winding leading and trailing edges overlie each other; and (g) said interlocked spiral seam being knurled.

\* \* \* \* \*